United States Patent
Svanfeldt

[19]

[11] Patent Number: 5,933,636
[45] Date of Patent: Aug. 3, 1999

[54] METHOD FOR CREATING SOFTWARE FOR TELECOMMUNICATION SWITCHES

[75] Inventor: Fredrik Svanfeldt, Stockholm, Sweden

[73] Assignee: Telefonktiebolaget LM Ericsson, Stockholm, Sweden

[21] Appl. No.: 08/847,415

[22] Filed: Apr. 24, 1997

Related U.S. Application Data

[63] Continuation of application No. 08/259,785, Jun. 14, 1994, abandoned.

[51] Int. Cl.$^6$ .................................................... G06F 9/45
[52] U.S. Cl. ............................................................ 395/702
[58] Field of Search ................................. 395/702, 703, 395/705, 701

[56] References Cited

U.S. PATENT DOCUMENTS

| | | | |
|---|---|---|---|
| 4,734,854 | 3/1988 | Afshar | 364/200 |
| 4,974,160 | 11/1990 | Bone et al. | 364/200 |

FOREIGN PATENT DOCUMENTS 0 544 637 A2  11/1991  WIPO .

OTHER PUBLICATIONS

Meyer, Bertrand, "Object–Oriented Software Construction," Prentice Hall Publishing, New York, section 1.2.4 (p. 6), section 3.3.5 (pp. 33–34), section 14.2.2 (pp. 326–327), and section 21.1 (pp. 445–446), 1988.

Meyer, Bertrand, "Object–Oriented Software Construction," Prentice Hall Publishing, New York, sections 4.5.1 and 4.5.2 (pp. 50–51), section 6.4 (p. 110), and section 14.1.4 (p. 325), 1988.

IEEE Software Magazine, May 1993, entitled Status Report: Software Reusability, pp. 61–66.

*Primary Examiner*—Tariq R. Hafiz
*Assistant Examiner*—Peter J. Corcoran, III
*Attorney, Agent, or Firm*—Jenkens & Gilchrist, A Professional Corporation

[57] ABSTRACT

The present invention is a method for creating common functionality software units suitable for controlling a telecommunications switch. The common functionality software units are created by performing a domain analysis on all existing telecommunication switches which results in the identification of common concepts, terminology, behavior, and functionality for all possible combinations of Bearer Service Handlers (BSHs) and types of hardware (HW) for the switches. The common behavior and functionality is implemented in a Universal Common Software Template (UCST), an associated Parameter Definition Document (PDD), and an associated Collection of Abstract Data Type Definitions (CADTD). The UCST is compiled and tested with a subset of the CADTD. After the UCST is compiled and tested, a plurality of common software function units (CSs) for the different combinations of BSH and HW may be created from the UCST and the CADTD.

18 Claims, 2 Drawing Sheets

METHOD FOR CREATING SOFTWARE FOR TELECOMMUNICATION SWITCHES

This application is a continuation of application Ser. No. 08/259,785, filed on Jun. 14, 1994, which was abandoned upon the filing hereof.

BACKGROUND

1. Field of the Present Invention

The present invention relates to methods of creating software for controlling complex electronic systems, and more particularly, to a method of creating software for controlling a telecommunications switch.

2. History of the Related Art

FIG. 1 (PRIOR ART) is a block diagram illustrating generally a modern telecommunications switch 102 used in telecommunication systems. The switch 102 includes at least one switch software module 110, switch hardware (HW) 108, a plurality of data inputs 104 to the switch 102, and a plurality of data outputs 106 from the switch 102. The switch hardware 108 allows data to be transferred at very high data rates.

The switch software module 110 provides switch user software 100 with a logical view of the switch 102. A logical view provides a switch user with a plurality of formats each of which indicates how data is received and transmitted within the switch 102, and the type of connection (e.g., point-to-point, point-to-multi-point, multi-point-to-point or multi-point-to-multi-point). Hereinafter, logical views of a switch are referred to as Bearer Service Handlers (BSHs). A BSH also enables a switch user having limited knowledge of the switch hardware 108 to control the switch hardware 108.

Incoming data is received on the data inputs 104 in one specified format and is transmitted in another specified format on the data outputs 106. The switch user software 100 communicates with the switch 102 via a user interface 112. The switch user software 100 specifies that data which is received in a first specified format on one or more of the data inputs 104, is switched to one or more of the data outputs 106 and transmitted in a second specified format. Some examples of specified formats are Asynchronous Transfer Mode—Virtual Path (ATM-VP), Asynchronous Transfer Mode—Virtual Channel (ATM-VC), Synchronous Transfer Mode—64 Kilo-bits per second (STM-64 k), and Synchronous Transfer Mode—2 Mega-bits per second (STM-2M).

ATM is a cell-switch technology based on a fixed length 53-byte cell. All broadband transmissions, whether audio, data, imaging or video, are divided into a series of cells and routed across an ATM network consisting of links connected by ATM switches. Each ATM link comprises a constant stream of ATM cell slots into which transmissions are placed or left idle, if unused. The most significant benefit of ATM is its uniform handling of services allowing one network to meet the needs of many broadband services. ATM technology was selected by the Consultative Committee on International Telephone and Telegraph (CCITT) International Standards Organization in 1988 to implement a broadband integrated services digital network (B-ISDN) in view of its flexibility and suitability for both transmission and switching. In ATM-VP, switching is accomplished by using a Virtual Path Identifier (VPI) value. In contrast, ATM-VC switching is accomplished by using both the VPI value and a Virtual Channel Identifier (VCI) value.

STM is a transport and switching method that depends on information occurring in regular and fixed patterns with respect to a reference such as a frame pattern.

Telecommunication switches are categorized according to the type of switching format the switch hardware supports. For example, switches that support STM format are referred to as "STM switches", and switches that support ATM format are referred to as "ATM switches". In the modern telecommunication industry, switches are created to support a plurality of specified formats. For example, an ATM switch may support both ATM-VP and ATM-VC specified formats, and a STM switch may support both STM-64 k and STM-2M.

FIG. 2 (PRIOR ART) is a block diagram illustrating a telecommunication switch 306 having switch software and switch hardware. Switch 306 comprises switch hardware of type A (SH-A) 314, and switch software units (SS1) 308, (SS2) 310 and (SS-1-2-A) 312. Switch 306 also supports BSHs of types 1 (BSH1) and 2 (BSH2) (not shown). Software units SS1 308 and SS2 310 are dependent upon BSH1 and BSH2, respectively. Software unit SS-1-2-A 312 is dependent upon BSH1, BSH2, and SH-A. User interfaces UI-BSH1 302 and UI-BSH2 304 support BSH1 and BSH2, respectively, and provide the user with the ability to select BSH1 or BSH2 on switch 306.

In the modern telecommunication industry, the software units SS1 308, SS2 310 and SS-1-2-A 312 are created solely for operation on one type of switch (ATM or STM) having a specific type of hardware and implementing at least one BSH. In other words, software units SS1 308, SS2 310 and SS-1-2-A 312 are not created from a Universal Common Software Template (UCST).

There are several disadvantages associated with the current design of software units for telecommunication switches. One such disadvantage results from the repetition of updates or changes for each software unit which is dependent upon a particular type of BSH or switch hardware. For example, changes which are made to the switch hardware must be reflected in updates to each software unit which is dependent upon the switch hardware, and changes which are made to a particular BSH must be reflected in updates to each software unit dependent upon the BSH. Another disadvantage with the current design of software units results from having different groups of developers create the software units for each type of switch. During the creation of the software units, the different groups of developers often use inconsistent terminology, concepts and architecture. The inconsistency in the software units produces increased difficulty in designing switch user software which interfaces with the software units.

It would be a distinct advantage to have a Universal Common Software Template (UCST) capable of creating common software units for a plurality of types of switch hardware and BSHs. The present invention provides such a UCST.

SUMMARY OF THE INVENTION

An object of the present invention is to provide a Universal Common Software Template (UCST) capable of designing and creating common functionality software units which do not require repetitive updates or changes.

Another object of the present invention, is to create common functionality software units which automatically reflect any changes made to the UCST.

A further object of the present invention is to reduce the time and expense involved in designing, creating, maintaining and updating common functionality software units. The reduction of time and expense results from having designers who are only required to be familiar with the UCST, and not the various common functionality software units.

A further object of the present invention, is to reduce software documentation to a single set of documentation for the implementation of all common functionality software units. The single set of documentation avoids inconsistency and confusion in the use of terms and phrases.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION

Figure 1:
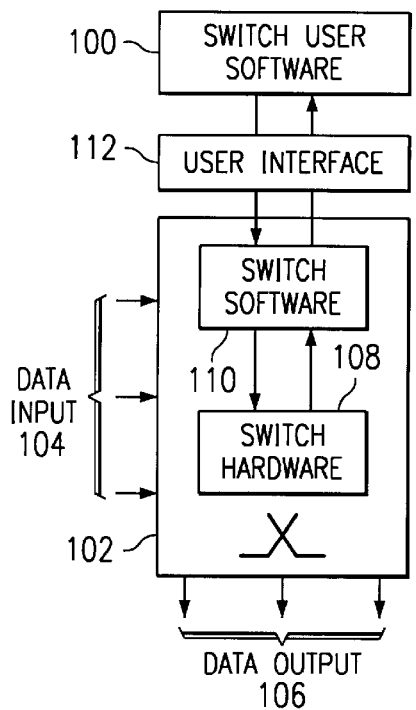
FIG. 1 (PRIOR ART) is a block diagram illustrating generally a modern telecommunications switch 102 which is used in telecommunication systems.
Figure 2:
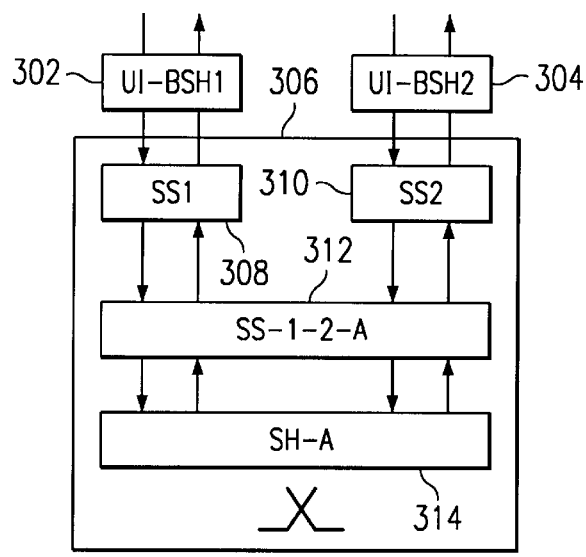
FIG. 2 (PRIOR ART) is a block diagram illustrating a telecommunications switch having switch software and switch hardware.
Figure 3:
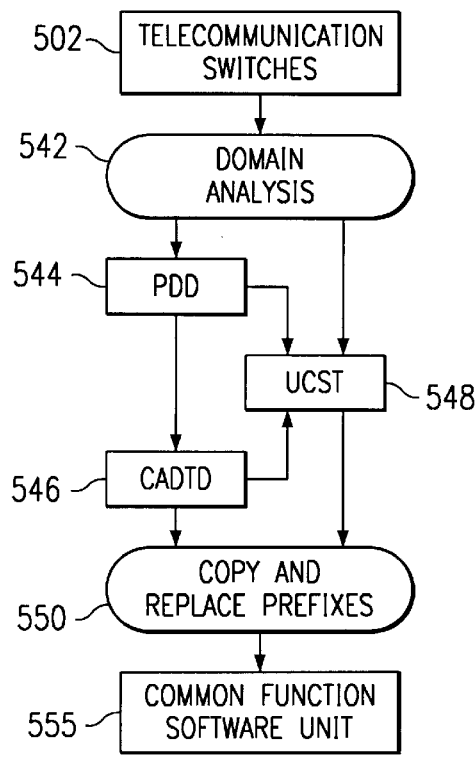
FIG. 3 is a functional block diagram illustrating the method of the present invention.

FIG. 3 is a functional block diagram illustrating the method of the present invention. All types of telecommunication switches 502 are studied in a domain analysis 542. The domain analysis 542 results in common concepts, terminology, behavior, and functionality for all possible combinations of BSH and HW for switches 502. The common behavior and functionality is implemented in a Universal Common Software Template (UCST) 548, an associated Parameter Definition Document 544 (PDD), and an associated Collection of Abstract Data Type Definitions 546 (CADTD). The PDD 544 comprises sections and chapters for parameters used in the UCST 548. The CADTD 546 is comprised of a plurality of abstract data typed definitions which are associated with the parameters of the UCST 548. The computer code which implements the UCST 548 and the CADTD 546 has prefixes which indicate BSH dependency, HW dependency or both BSH and HW dependency. The UCST 548 is compiled and tested with a subset of the CADTD 546. After the UCST 548 has been compiled and tested, a plurality of common function software units (CSs) for the different combinations of BSH and HW are created from the UCST 548 and the CADTD 546. Common function software units (CSs) are created by copying associated computer code from the UCST 548 and CADTD 546. Prefixes which exist within the copied computer code are replaced with prefixes which identify the combination of BSH and HW supported by the switch in which the CS is to operate. For example, common functionality software unit (CS) 555 may be created by copying associated computer code from the UCST 548 and CADTD 546. Prefixes which exist within the copied computer code are replaced with prefixes which identify the BSH and HW for the switch in which the CS 555 is to operate.

Figure 4:
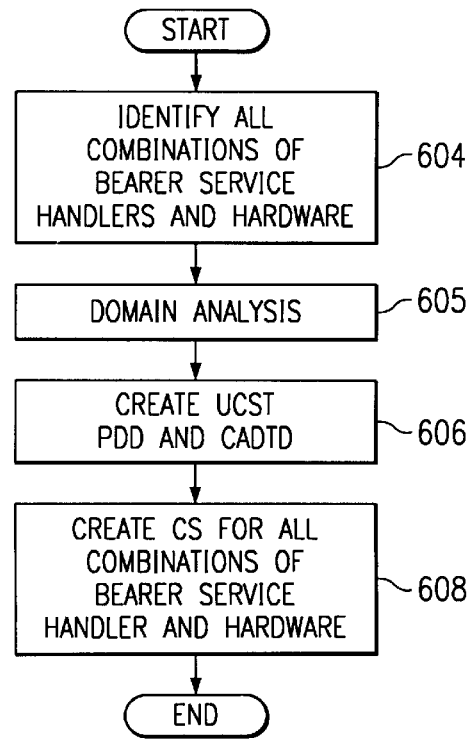
FIG. 4 is a flow chart generally illustrating the operations for creating common functionality software units in the preferred embodiment of the present invention.

FIG. 4 is a flow chart generally illustrating the operations for creating common functionality software units in the preferred embodiment of the present invention. First, all possible combinations of bearer service handlers and types of hardware for a set of telecommunication switches are identified at step 604. Next, a domain analysis is performed on the above-identified bearer service handlers and hardware at step 605. A Universal Control Software Template (UCST), a Parameter Definition Document (PDD), and a Collection of Abstract Data Type Definitions (CADTD) are created from the domain analysis at step 606. At step 608, common functionality software units are created from the UCST and CADTD. Each of the above steps is described in greater detail below.

At step 604, all combinations of bearer service handlers with different types of hardware for a set of switches are identified. For example, bearer service handlers 1, 2, 3 and 4, and hardware types A, B, C, and D may exist for a particular set of switches. The possible combinations for the above bearer service handlers and hardware types may exist as illustrated in Table I below.

TABLE I

|            | BSH1 | BSH2 | BSH3 | BSH4 |
|------------|------|------|------|------|
| Hardware A | X    | X    |      |      |
| Hardware B |      |      | X    | X    |
| Hardware C | X    |      |      |      |
| Hardware D |      |      | X    | X    |

Thus, bearer service handler 1 operates on hardware of types A or C, bearer service handler 2 operates on hardware of type A, bearer service handler 3 operates on hardware of types B or D, and bearer service handler 4 operates on hardware of types B or D.

At step 605, a domain analysis is performed to determine the common functionality and behavior for the combinations determined at step 604. Several domain analysis techniques exist which may be employed. A domain analysis generally comprises (1) gathering experts having knowledge of each bearer service handler and hardware type; and (2) defining common concepts and terminology.

Figure 5:
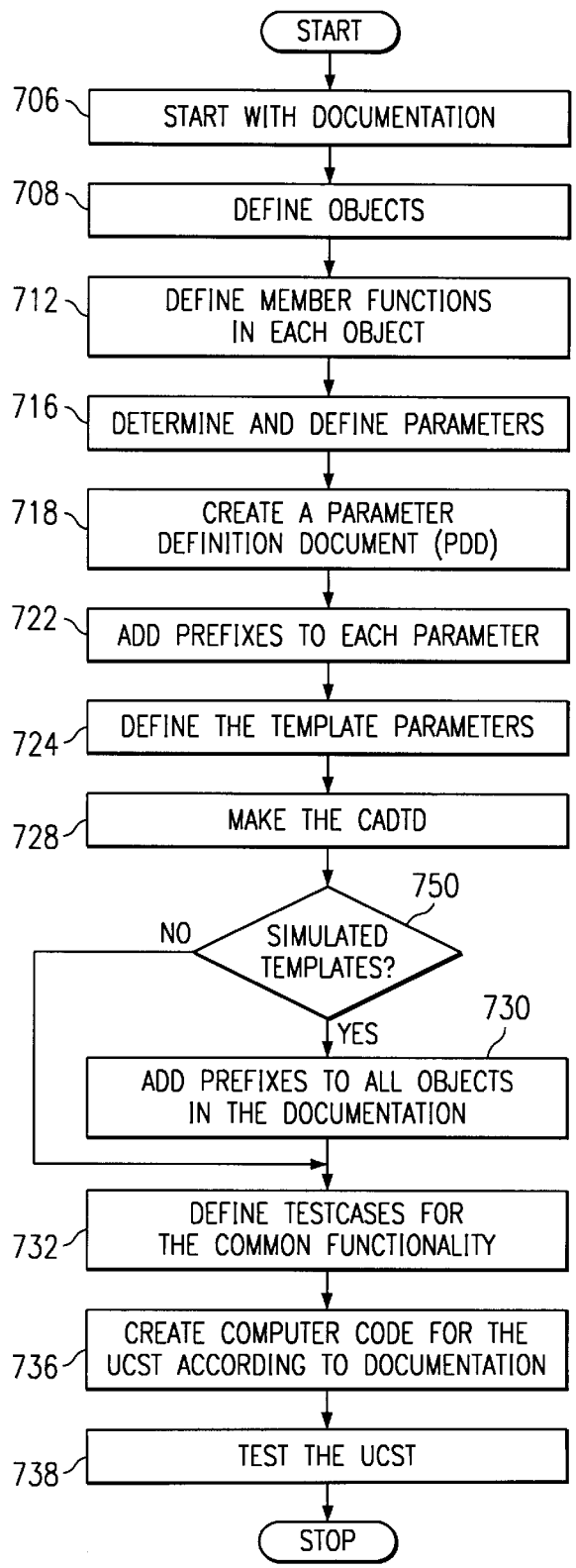
FIG. 5 is a flow chart illustrating in greater detail the steps of creating the Universal Common Software Template (UCST), Parameter Definition Document (PDD) and Collection of Abstract Data Type Definitions (CADTD) of FIG. 4.

FIG. 5 is a flow chart illustrating in greater detail the steps of creating the UCST, PDD and CADTD at step 606 in FIG. 4. First, documentation describing the common functionality and terminology is created at step 706. The documentation is continuously updated throughout the process of creating the UCST, PDD and CADTD. In the preferred embodiment of the present invention an object oriented programming language such as Borland C++ which is produced by Borland International, Inc., or Visual C++ which is produced by Microsoft Inc. is used at step 708 to define and implement objects, each one of which implements a subset of the common functionality. Hereinafter, the object oriented programming language is referred to as C++.

A member function for implementing a subset of the common functionality is created for each of the objects at step 712. A member function is an independent processing operation represented by a name and an optional argument list. Member functions are analogous to the functions defined for a class in C++ and similar to the procedures and functions declared in conventional software systems.

At step 716, parameters for the defined objects are determined and defined. A parameter is a symbol that is replaced by a supplied variable when a member function is invoked. Each parameter is associated with a particular data type definition. Each of the member functions which is created from the domain analysis and associated argument lists, represents a common functionality concept. Therefore, each member function comprises the same name and same number of arguments, regardless of the combination of BSH and hardware type used.

Each of the arguments has an associated data type definition which is defined by a parameter. The parameter for each argument also has the same name for each combination of BSH and HW. However, different combinations of BSH and HW require different data type definitions. Therefore, the data type definition which the parameter defines must also be different for BSH and HW combinations which require it. For example, an ATM-VC switch offering a particular BSH may require a parameter called ChannelNumber to have a data type definition of (Integer, Integer) which indicates VPI and VCI, respectively, while an ATM-VP switch implementing the same BSH may require ChannelNumber to have a data type definition of (Integer) indicating VPI.

The PDD is created at step 718. The PDD comprises a list of parameter names with associated data type definitions for each combination of BSH and HW. Prefixes are added to each of the parameters at step 722. A prefix is chosen for each of the identified BSHs, types of HW, and combinations of BSHs and types of HW. Each of the chosen prefixes must be as short as possible while retaining the ability to adequately identify a BSH, a type of HW or a combination of BSH and HW. Each of the chosen prefixes must also be the same length. In addition, a set of three template prefixes are used to identify if a parameter is (1) solely BSH dependent; (2) solely HW dependent; or (3) both BSH and HW dependent. The template prefixes are also required to be the same length as the chosen prefixes. Furthermore, each of the template prefixes are exclusive and may not be used in any other combination within the computer code (including comments) of the member functions. For example, template prefixes for Table I may be BSH, HWR, and BHW, representing parameters which are solely BSH dependent, solely HW dependent, and BSH and HW dependent, respectively.

The chosen prefixes are added to each of the parameters within the PDD at step 722. However, before the chosen prefixes are added, each of the parameters are categorized into individual sections within the PDD. The sections are as follows: "generic", solely "BSH dependent", solely "HW dependent", and "BSH and HW dependent". Parameters which have the same data type definitions for all types of BSHs and HW are categorized and placed in the "generic" section. Parameters which are solely BSH dependent and have the same data type definition for all types of BSHs are categorized and placed in the "BSH dependent" section. Parameters which are solely HW dependent and have the same data type definition for all types of HW are categorized and placed in the "HW dependent" section. Parameters which are BSH and HW dependent and have the same data type definition for all types of BSHs and HW are categorized and placed in the "BSH and HW dependent" section. In addition, separate chapters are created for each type of BSH, HW, and combination of BSH and HW.

Generic parameters do not have prefixes added to their names. BSH dependent parameters have a prefix added to their names which indicates BSH dependency. For example, a member function responsible for setting up a connection through a switch may require a parameter called Address which may be represented as Address=[integer, ChannelNumber, integer, ChannelNumber]. The Address parameter comprises a numeric Id for the input to a switch, an input channel number, a numeric Id for the output of the switch, and an output channel number. No prefixes are added to the parameters which represent the numeric Id for the input and output of the switch, since they are generic. The ChannelNumber parameters, however, have different definitions for each type of BSH and therefore, a prefix of "BSH" is added to the name of the parameters. In addition, the Address parameter is by definition dependent upon the type of BSH and also has the prefix "BSH" added to the parameter's name. The Address type definition with the added prefixes may be represented as "BSHAddress [integer, BSHChannelNumber, integer, BSHChannelNumber]". Therefore, the type definition BSHAddress is BSH dependent and has the same data type definition for all combinations of BSH and HW.

HW dependent parameters have a prefix added to their names indicating HW dependency. BSH and HW dependent parameters have a prefix added to their names indicating BSH and HW dependency. All parameters which are BSH dependent and have different data type definitions for each type of BSH are categorized and placed in a separate section for each type of BSH in the PDD. For example, each of the BSH types BSH1–BSH4 in Table I would have a separate section in the PDD for parameters which are dependent on them. All parameters which are HW dependent and have different data type definitions for each type of HW are categorized and placed in a separate section for each type of HW in the PDD. For example, each of the types of HW A–D in Table I would have a separate section in the PDD for parameters which are dependent on them. Each of the parameters which are BSH and HW dependent and have different type definitions for each combination of BSH and HW are categorized and placed in a separate section in the PDD for each combination. For example, each of the BSH and HW combinations which are indicated with an "X" in Table I would have a separate section in the PDD for parameters which are dependent upon them.

Template parameters which are used for testing the UCST are defined at step 724. Each parameter which has a different definition for different combinations of BSH and HW is defined as a template parameter. Template parameters receive a prefix in the same manner as discussed above in connection with the BSH and HW dependent parameters. Template parameters which are BSH, HW, or BSH and HW dependent are categorized and placed in a section for each of the dependencies in the PDD.

The CADTD is created at step 728. In the preferred embodiment of the present invention the CADTD is created in C++. However, it would be obvious for a person of ordinary skill in the art that any object oriented programming language may be used. Object oriented programming languages provide a user with the ability to create user-defined data types, hereinafter referred to as Abstract Data Types (ADTs). An ADT may be comprised of other ADTs and/or fundamental data types which are already defined by the programming language (e.g., integer, float, long integer, and double). Each parameter within the PDD is defined by an ADT or fundamental data type.

At step 750, it is determined whether or not to implement the UCST with simulated templates. If the programming language does not support templates, then simulated templates are implemented by adding prefixes to all the objects in the documentation at step 730. Otherwise, language templates are created for all the objects in the documentation. A template such as that which is offered by C++ may be used to create a generic member function which has parameters that are independent of any data type definition. The C++ compiler utilizes this generic member function (template) to generate the computer code (non-generic member function(s)) which implements each unique combination of ADTs. In other words, the C++ compiler performs the labor involved in creating individual member functions for each unique combination of ADTs.

Template prefixes are added to the names of all the objects in the documentation at step 730 (i.e., templates were not used). This is similar to the process in which prefixes were added to the parameters. The objects are categorized as either generic, BSH dependent, HW dependent, or BSH and HW dependent. A prefix is added to each object's name which is representative of the categorization of that object. Test cases for the UCST are defined at step 732. Test cases are defined for each individual object within the UCST in order to verify that the object is functioning according to its design.

The computer code which comprises the UCST is created at step 736. All objects which implement the UCST are created in accordance with the documentation (which includes template prefixes and the CADTD template prefixes). In the preferred embodiment of the present invention the objects are implemented as classes in C++, however, it would be obvious to a person of ordinary skill in the art that any object oriented computer programming structure could be used. In addition, computer code which is required to test the UCST is created at step 736. The testing of the UCST is performed at step 738. The UCST is tested according to each of the test cases previously defined.

Figure 6:
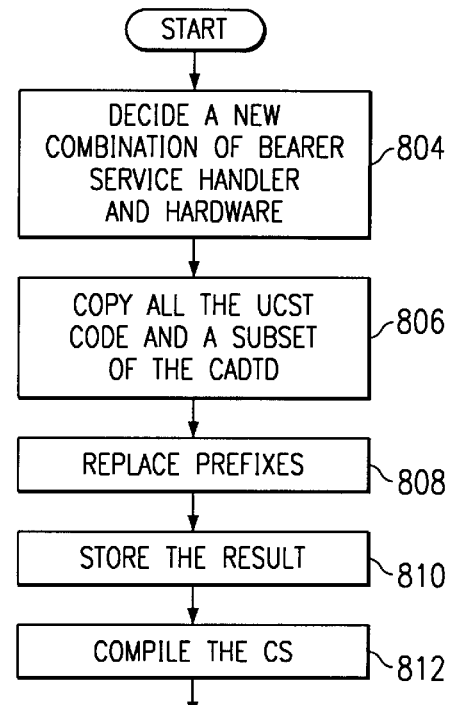
FIG. 6 is a flow chart which illustrates in greater detail the steps of creating a common function software unit (CS) of FIG. 4.

FIG. 6 is a flow chart which illustrates in greater detail the steps of creating a CS at step 608 in FIG. 4. The creation of a CS begins by determining the combination of BSH and HW for the switch the CS is to operate on at step 804. The computer code for implementing the CS is copied from the UCST, and an associated subset of the CADTD is also copied at step 806. The associated subset comprising all the associated ADTs which are generic, BSH dependent, HW dependent, and ADTs which are specific for the combination of BSH and HW. The template prefixes in the copied code are replaced with prefixes for the combination of BSH and HW at step 808. After the prefixes have been replaced in the copied code, the copied code is saved (stored) at step 810. At step 812, the copied code is compiled into an executable format capable of executing on a telecommunications switch.

Maintenance which is performed on the UCST is directly reflected in a CS which is created from it. For example, if an error is corrected or an update is performed on the UCST, the updates or corrections are automatically reflected in all CSs which are created from the UCST thereafter.

Figure 7:
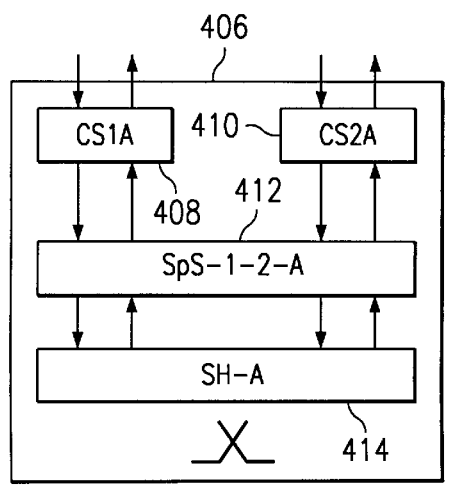
FIG. 7 is a block diagram illustrating a telecommunications switch comprising common function software units which were created from a Universal Common Software Template (UCST) and a Collection of Abstract Data Type Definitions (CADTD) in accordance with the teachings of the present invention.

FIG. 7 is a block diagram illustrating a telecommunications switch 406 comprising common function software units CS1A 408 and CS2A 410 which were created form A UCST and a CADTD in accordance with the teachings of the present invention. The telecommunications switch 406 comprises common function software units CS1A 408 and CS2A 410, specific software unit SPS-1-2-A, and hardware of type A 414 (SH-A). The switch 406 supports bear service handlers of types 1 (BSH1) and 2 (BSH2). CS1A 408 is dependent upon BSH1 and hardware of type A. CS2A 410 is dependent upon BSH2 and hardware of type A. Specific software unit SPS-1-2-A 412 is dependent on BSH1, BSH2, and hardware of type A.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

What is claimed is:

1. A method of creating a common functionality software unit for a designated one of a plurality of telecommunication switches, each one of said plurality of telecommunication switches having a particular type of hardware and supporting a particular bearer service handler, said method comprising the steps of:

creating a universal common software template comprising a plurality of common functionality software units, each one of said plurality of common functionality software units having a plurality of template prefixes and at least one parameter by executing a global domain analysis on at least one of said telecommunication switches and identifying a plurality of combinations, each one of said plurality of combinations comprising one of said plurality of bearer service handlers and one of said plurality of types of hardware;

identifying a plurality of common functions existing within each one of said plurality of combinations; and creating a plurality of function classes to implement each one of said plurality of common functions, creating a collection of abstract data type definitions, said collection comprising a data type definition for each one of said parameters;

copying one of said plurality of common functionality software units from said universal common software template, said copied common functionality software unit being compatible with said particular bearer service handler and said particular type of hardware of said designated telecommunication switch; and replacing the plurality of template prefixes in said copied common functionality software unit with chosen prefixes that identify said particular bearer service handler and said particular type of hardware for each of said designated telecommunication switches.

2. The method of claim 1 further comprising the step of:

creating a parameter definition document comprising at least one definition for each one of said parameters.

3. The method of claim 1 wherein said step of creating a plurality of classes includes the step of: attaching a template prefix to each one of said plurality of classes.

4. The method of claim 3 wherein said step of creating a collection of abstract data type definitions includes the step of:

attaching an independent template prefix to each one of said data type definitions, said independent template prefix being independent of said plurality of bearer service handlers and said plurality of types of hardware.

5. The method of claim 4 wherein said step of creating a collection of abstract data type definitions includes the step of:

attaching a first dependent template prefix to each one of said data type definitions, said first dependent template prefix being dependent on one of said plurality of bearer service handlers and independent of said plurality of types of hardware.

6. The method of claim 5 wherein said step of creating a collection of abstract data type definitions includes the step of:

attaching a second dependent template prefix to each one of said data type definitions, said second dependent template prefix being dependent on one of said plurality of types of hardware and independent of said plurality of bearer service handlers.

7. The method of claim 6 wherein said step of creating a collection of abstract data type definitions includes the step of:

attaching a third dependent template prefix to each one of said data type definitions, said third dependent template prefix being dependent on one of said plurality of combinations.

8. The method of claim 7 wherein said step of replacing the plurality of template prefixes in said copied common functionality software unit includes the step of:

replacing each one of said third dependent template prefixes with a third chosen prefix that identifies said particular type of hardware and said particular bearer service handler of said designated switch.

9. The method of claim 5 wherein said step of replacing the plurality of template prefixes in said copied common functionality software unit includes the step of:

replacing each one of said first dependent template prefixes with a first chosen prefix that identifies said particular bearer service handler of said designated switch.

10. The method of claim 6 wherein said step of replacing the plurality of template prefixes in said copied common functionality software unit includes the step of:

replacing each one of said second dependent template prefixes with a second chosen prefix that identifies said particular type of hardware of said designated switch.

11. A method of creating a universal common software template for a plurality of telecommunication switches, each one of said plurality of telecommunication switches having a particular type of hardware and supporting a particular bearer service handler, said method comprising the steps of:

identifying via a global domain analysis, a plurality of combinations, each one of said plurality of combinations comprising one of said plurality of bearer service handlers and one of said plurality of types of hardware;

identifying a plurality of common functions existing within each one of said plurality of combinations; and creating a plurality of classes to implement each one of said plurality of common functions;

identifying a plurality of common functions existing within each one of said plurality of combinations; and creating a plurality of classes to implement each one of said plurality of common functions.

12. The method of claim 11 wherein said step of creating a plurality of classes includes the step of:

attaching a template prefix to each one of said plurality of classes.

13. The method of claim 12 wherein each one of said plurality of classes includes at least one parameter.

14. The method of claim 13 wherein said step of creating a plurality of classes includes the step of:

creating a collection of abstract data type definitions, said collection comprising a data type definition for each one of said parameters.

15. The method of claim 14 wherein said step of creating a collection of abstract data type definitions includes the step of:

attaching an independent template prefix to each one of said data type definitions, said independent template prefix being independent of said plurality of bearer service handlers and said plurality of types of hardware.

16. The method of claim 15 wherein said step of creating a collection of abstract data type definitions includes the step of:

attaching a first dependent template prefix to each one of said data type definitions, said first dependent template prefix being dependent on one of said plurality of bearer service handlers and independent of said plurality of types of hardware.

17. The method of claim 16 wherein said step of creating a collection of abstract data type definitions includes the step of:

attaching a second dependent template prefix to each one of said data type definitions, said second dependent template prefix being dependent on one of said plurality of types of hardware and independent of said plurality of bearer service handlers.

18. The method of claim 17 wherein said step of creating a collection of abstract data type definitions includes the step of:

attaching a third dependent template prefix to each one of said data type definitions, said third dependent template prefix being dependent on one of said plurality of combinations.

* * * * *

UNITED STATES PATENT AND TRADEMARK OFFICE
CERTIFICATE OF CORRECTION

PATENT NO. : 5,933,636
DATED : August 3, 1999
INVENTOR(S) : Fredrik Svanfeldt

It is certified that error appears in the above-identified patent and that said Letters Patent is hereby corrected as shown below:

On the title page, item

[56] References Cited:  U.S. Patent Documents:
  5,388,258    2/7/95  Larsson, et al  395/600
  4,734,854    3/29/88  Afshar . . .   395/700

Other Publications:
Stroustrup, Bjarne.  "The C++ Programming Language - Second Edition." Addison-Wesley. Reading, MA. 1991. pp. 255-291, 434-439, and 600-601. Date 1991

Signed and Sealed this

Twenty-sixth Day of September, 2000

Attest:

Q. TODD DICKINSON

*Attesting Officer*   *Director of Patents and Trademarks*